Feb. 18, 1964 W. B. McCARDELL 3,121,352
TOOTH FORMING METHOD AND APPARATUS
Filed May 18, 1961 2 Sheets-Sheet 2

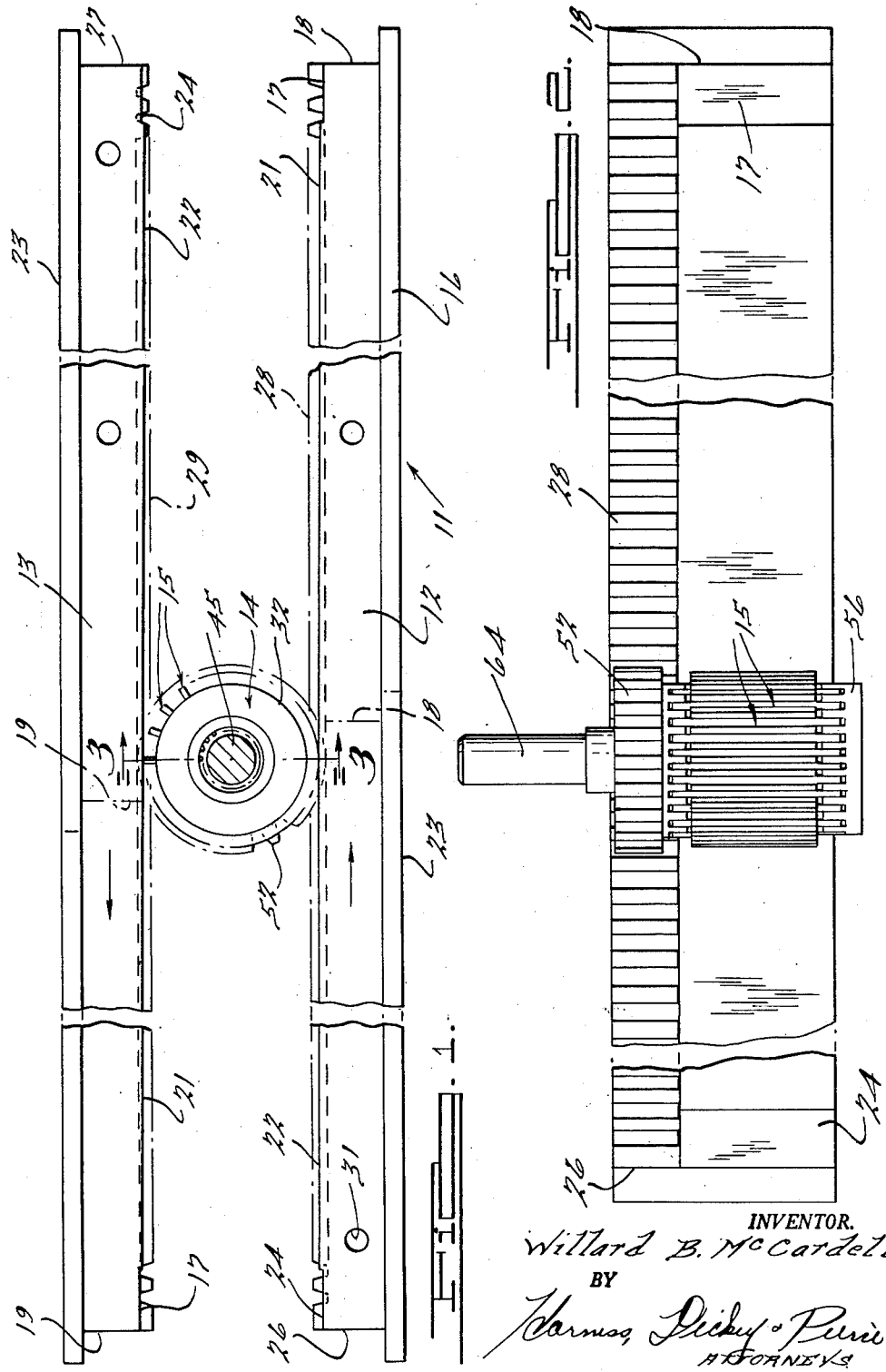

INVENTOR.
Willard B. McCardell
BY
Harness, Dickey & Pierce
ATTORNEYS

United States Patent Office 3,121,352
Patented Feb. 18, 1964

3,121,352
TOOTH FORMING METHOD AND APPARATUS
Willard B. McCardell, Royal Oak, Mich., assignor to Michigan Tool Company, Detroit, Mich., a corporation of Delaware
Filed May 18, 1961, Ser. No. 110,975
11 Claims. (Cl. 78—45)

This invention relates to tooth forming methods and apparatus, and more particularly to methods and apparatus for forming external teeth in cylindrical workpieces.

It is an object of the invention to provide a novel and improved tooth forming method and apparatus in which a relatively small number of teeth may be formed on a cylindrical workpiece in an extremely rapid manner and with the workpiece in a cold condition.

It is another object to provide an improved method and application of this nature in which different types of tooth forms may be fabricated, and in which the teeth may have flat flanks if desired.

It is a further object to provide a novel method and apparatus of the above nature which are extremely dependable and require a minimum amount of work to close tolerances in fabricating the tools.

Other objects, features, and advantages of the present invention will become apparent from the subsequent description, taken in conjunction with the accompanying drawings.

In the drawings:

FIGURE 1 is a front elevational view of a preferred embodiment of the invention, showing the oppositely disposed pressure dies and the cage carrying the tooth forming blades;

FIGURE 2 is a plan view of the apparatus in FIGURE 1 with the upper die removed, showing the drive gear and rack;

Figure 3:
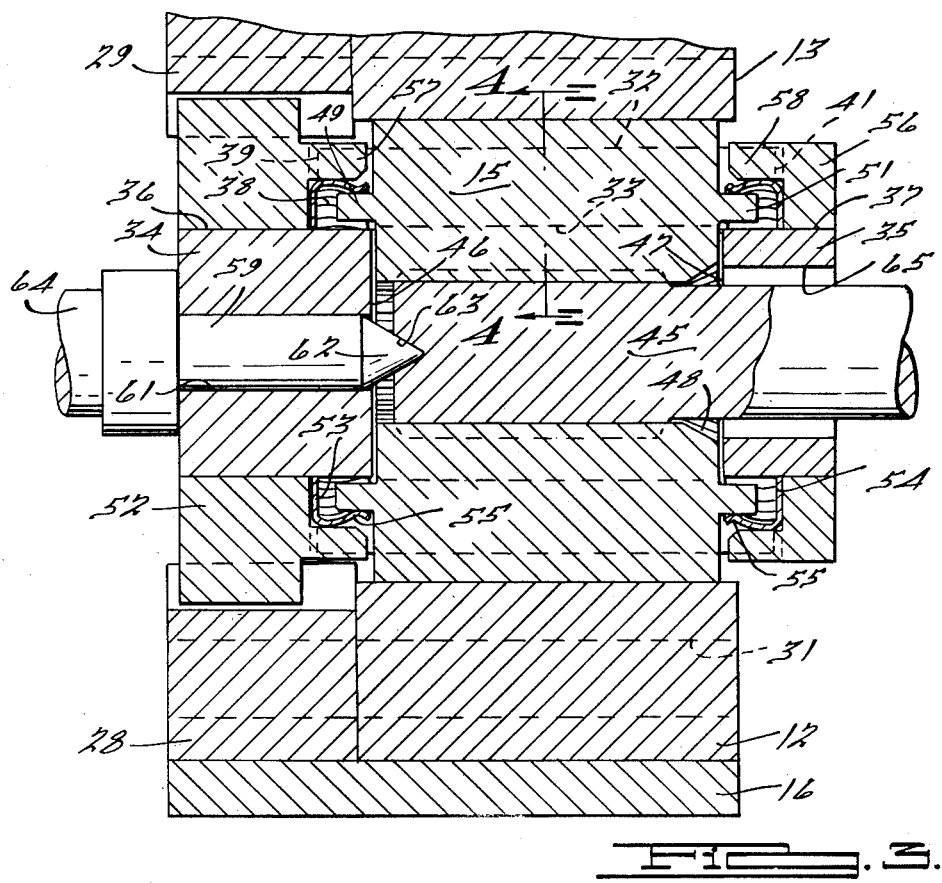
FIGURE 3 is an enlarged elevational view in cross section taken along the line 3—3 of FIGURE 1 and showing the cage and blade construction.

In general terms, the invention comprises the concept of surrounding a workpiece with a plurality of radially disposed elements the inner ends of which have shapes complementary to the interdental spaces of the teeth to be formed on the workpiece, and gradually forcing these elements radially inwardly until the interdental spaces and thus the teeth are formed.

In the illustrated embodiment, a cage is provided which surrounds the workpiece and carries the radially disposed elements in the form of blades having outer ends extending from the cage. The workpiece is supported on centers for rotation about its longitudinal axis, and a pair of elongated forcing dies with gradually inclined flat surfaces are moved in opposite directions on opposite sides of the cage. These dies engage the outer ends of the blades and force them gradually radially inwardly as the cage rotates along with the die movement. The cage rotation is maintained by a gear on the cage meshing with racks on the two dies.

Referring more particularly to the drawings, the apparatus for carrying out the invention is generally indicated at 11 and comprises a pair of elongated forcing dies 12 and 13, a cage generally indicated at 14 of generally annular shape, and a plurality of identically constructed forming blades generally indicated at 15 carried by the cage. The dies 12 and 13 are each adapted by means of a base 16 to be mounted on a pair of oppositely reciprocating beds (not shown) so that the die 12 is driven to the right as viewed in FIGURE 1 while the die 13 is simultaneously driven to the left during their advancing or working strokes.

Each die 12 and 13 has a flat surface, these surfaces being in facing relation. The first portions 17 of these surfaces extending rearwardly from the forward ends 18 and 19 of the dies 12 and 13, respectively, are relieved, for the purpose of permitting parts to be loaded as will hereinafter appear. A gradually tapered or inclined portion 21 appears on each surface 16 extending rearwardly from the portions 17, the inclination causing the height of each die to increase in a rearward direction. The total increase in height due to this taper is approximately equal to the desired depth of penetration of the blades 15. Rearwardly of the portions 21 are portions indicated at 22 in FIGURE 1 which are parallel to the undersurfaces 23 of the dies and more particularly to their direction of movement. The length of the surface portions 22 is preferably equal to the circumference of a circle surrounding the outer ends of the blades 15, so that the depth of penetration of the blades will be equalized. Another relieved portion 24 is provided adjacent the rearward ends 26 and 27 of the dies 12 and 13 respectively, the purpose of these relieved portions being to permit the workpieces to be withdrawn after they have been formed without having to first return the dies to their original position.

A pair of racks 28 and 29 are secured alongside the dies 12 and 13, respectively, as shown in FIGURES 2 and 3, by means of fasteners extending through apertures 31 in the dies and racks. These racks have facing teeth adapted to mesh with a drive gear carried by the cage 14, as described below.

The cage is of generally annular shape, its main portion having a cylindrical outer surface 32 and a cylindrical inner surface 33, these surfaces being indicated in FIGURE 3. A first extension 34 is formed at one end of the cage 14, and a second extension 35 at the other end, as shown in FIGURE 3. The outer cylindrical surfaces 36 and 37 of the extensions 34 and 35, respectively, are of slightly less diameter than the diameter of the inner cylindrical surface 33. A plurality of equidistant, circumferentially spaced, radially extending slots 38 are formed in the cage 14, these slots extending from the outer surface 32 to the inner surface 33 and from one end 39 to the other end 41 of the main cage portion. The opposite ends of the surface 33 are spaced a substantial axial distance inwardly of the ends 39 and 41, thus permitting the slots, and cage extensions 34 and 35, to be formed. Preferably, these slots, which have parallel rather than exactly radially disposed side walls, are finished by grinding, it being noted that the choice of relative diameters of the surfaces 33, 36 and 37 will permit through grinding of the slots from one end to the other, thus facilitating accurate finishing.

Figure 4:
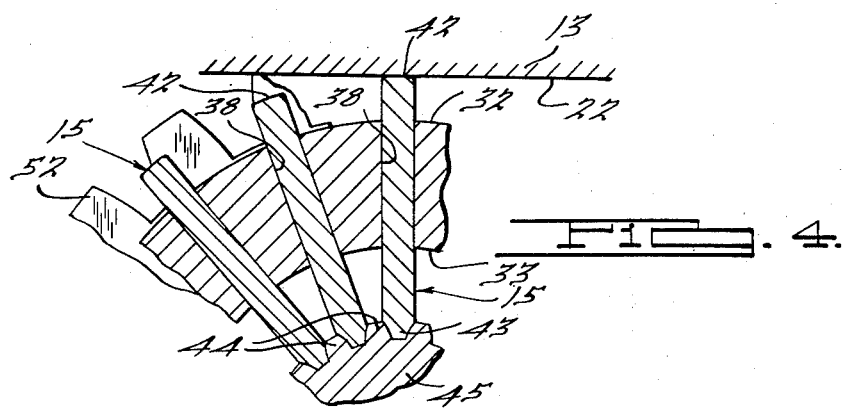
FIGURE 4 is an enlarged fragmentary sectional view taken along line 4—4 of FIGURE 3 and showing the manner in which blades penetrate the workpiece.

The blades 15 are slidably disposed within the slots 38, each blade being of generally rectangular shape with flat sides adapted to slide radially in the slots. The outer ends 42 of the blades 15 are preferably curved, as shown in FIG. 4, and the inner ends 43 are shaped so as to be complementary to the desired shape of the interdental spaces between the teeth 44 of a workpiece 45, as shown in FIGURE 4.

It may be noted at this point that an even number of slots and blades are shown. The illustrated embodiment of the invention would require such an even number, so that the forces exerted by the two dies 12 and 13 will counteract each other at all times. The number and shape of the forcing dies could however be varied within the principles of the invention.

The height of the blades 15 is substantially greater than the depth of the slots 38, so that the outer ends of the blades will be engageable by the dies 12 and 13 while the inner ends may engage a workpiece 45 centrally disposed within the cage 14. The length of the blades 15 is substantially less than the width of the facing surfaces of the dies 12 and 13. This length is also preferably slightly less than the distance between the facing inner end surfaces 46 and 47 of the cage extensions 34 and 35, respectively, in order to allow for momentary cocking of the blades when the workpiece is inserted. The inner corners 48 of the blades 15 adjacent the extension 35 are outwardly flared to facilitate insertion of the workpiece 45. Each blade 15 has a pair of oppositely disposed ears 49 and 51 extending from the ends thereof for engagement by springs as will later appear.

The drive gear 52 is secured to the extension 34, this gear having teeth meshing with racks 28 and 29. The pitch diameter of the gear 52 is preferably about the same as the diameter of a circle just enclosing the outer ends 42 of the blades 15 when the blades have penetrated about half their full distance into the workpiece. It is also desirable that substantial backlash be provided between the gear 52 and the racks. It has been found that such backlash will permit the rate of cage rotation to adjust itself slightly during operation, and will avoid the possibility of the cage being subjected simultaneously to two discrepant driving forces from the two racks which might otherwise create undesirable stresses or slippage.

A pair of annular flat members 53 and 54, fabricated of spring steel, are mounted on the extensions 34 and 35, respectively, these members having a plurality of circumferentially spaced fingers 55 extending inwardly and engaging the ears 49 and 51 on the blades 15, so as to urge the blades radially inwardly. The inward movement of the blades will be limited by the engagement of the ears 49 and 51 with the continuations (in slots 38) of the outer cage extension surfaces 36 and 37. A retaining members 56 is rigidly mounted on the extension 35, and the gear 52 as well as the member 56 have inwardly extending portions 57 and 58 respectively disposed within the slots 38. These portions serve to restrain outward movement of the spring fingers 55 and to confine lateral movement of the blades 15 while being slightly spaced from the latter. A center 59 is disposed within a bore 61 within the cage extension 34, this center having a tapered inner end 62 for supporting the workpiece 45 by means of a tapered recess 63 in the end of the workpiece. The other end 64 of the center 59 extends axially outwardly from the cage 14 so as to be supported for rotation by stationary means (not shown).

A clearance bore 65 is provided in the cage extension 35 for permitting entry and withdrawal of the workpiece 45. The end of the workpiece on which the teeth are to be formed may have a blank diameter somewhat larger than the diameter of the remainder of the workpiece, as seen in FIGURE 3. This blank diameter will be conveniently chosen so as to produce the type of workpiece desired, it being noted that variations in the blank diameter will not affect the accuracy of tooth spacing but may affect the final major or outside diameter of the workpiece.

In operation, the two dies 12 and 13 are initially positioned so that their forward ends 18 and 19 are as shown by the dot-dash lines in FIGURE 1. When in this position the workpiece 45 may be inserted from the right in FIGURE 3, the flared surfaces 48 of the blades 15 and relieved portions 17 of the dies 12 and 13 permitting the blades to be shifted radially outwardly by the entering workpiece. The spring fingers 55 will urge all of the blades 15 inwardly so as to engage the workpiece surface.

After the workpiece is mounted on the center 59 and supported at its other end by appropriate center means (not shown), the dies 12 and 13 will be simultaneously driven in opposite horizontal directions, the lower die 12 moving to the right in FIGURE 1 as shown by the arrow, while the upper die 13 moves to the left. As the inclined flat surfaces 21 of the two dies begin to engage the outer ends 42 of successive pairs of diametrically opposed blades 15, the blades will be gradually and successively forced radially inwardly so as to penetrate the workpiece 45. Since the inner ends 43 of the blades are shaped so as to be complementary to the desired interdental tooth form, teeth 44 will be formed on the workpiece between the blades as shown in FIGURE 4. The blades 15, together with the workpiece 45, will be rotated at a rate synchronized with the movement of the dies 12 and 13 by the gear 52 meshing with the racks 28 and 29. Each blade 15 will thus be moved inwardly twice during each revolution until the areas 22 of the die surfaces are reached.

These areas 22, which are spaced apart a distance such that the blades 15 are at their full penetrating depth, are preferably of such length that full and equal penetration of all the blades around the cage 14 will be assured. When the dies 12 and 13 reach their end positions, the relieved portions 24 at the rearward ends of the dies will be adjacent the cage 14, so that the blades 15 are no longer subjected to pressure, except the relatively light pressure exerted by the spring fingers 55. The fully formed workpiece 45 may thus be extracted to the right in FIGURE 3 from between the blades 15.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a method for forming external teeth on a cylindrical workpiece, the steps of providing a plurality of forming elements equal in number to the interdental spaces to be formed and having portions with shapes complementary to said interdental spaces, supporting said elements in circumferentially spaced relation for radial movement with respect to the workpiece axis, simultaneously forcing a first pair of diametrically opposed elements radially inwardly so as to penetrate the workpiece a slight distance, forcing a second pair of diametrically opposed elements adjacent said first pair radially inwardly so as to penetrate said workpiece a slight distance, forcing successive adjacent pairs of diametrically opposed elements radially inwardly, and gradually increasing the depth of penetration of all said elements by said successive engagement of pairs of diametrically opposed elements until all the elements have been caused to penetrate the workpiece the full desired distance.

2. In an apparatus for forming external teeth on a cylindrical workpiece, an annular cage, first and second axial extensions on opposite sides of said cage, the outer diameters of said extensions being smaller than the inner diameter of the main cage portion, a plurality of circumferentially spaced radially extending slots in said cage, said slots having parallel side walls and extending axially between said cage extensions, a plurality of tooth forming blades slidably mounted in said slots, the inner ends of said blades being disposed within said cage and having shapes complementary to the interdental spaces to be formed on the workpiece, the outer ends of said blades extending outwardly from the cage, and means for gradually forcing successive blades radially inwardly against a workpiece centrally disposed within said cage.

3. The combination according to claim 2, said last-mentioned means comprising a pair of dies disposed on opposite sides of said cage and having flat inclined surfaces engaging the outer ends of said blades, said dies being simultaneously movable in opposite directions, and gear means carried by said dies and cage for causing said cage to rotate synchronously with said dies.

4. The combination according to claim 2, further provided with spring means in said cage for urging said blades radially inwardly, and flared portions at one end of said blades for permitting a workpiece to be forced therebetween against the urging of said spring means.

5. The combination according to claim 2, further provided with a workpiece supporting center carried by one of said extensions and protruding into said cage.

6. In an apparatus for forming external teeth on a cylindrical workpiece, an annular cage having a plurality of circumferentially spaced radially extending slots, tooth forming blades slidably mounted in said slots, the inner edges of said blades having shapes complementary to the desired interdental space forms on the workpiece, the outer edges of said blades extending outwardly from said cage, a pair of elongated forcing dies disposed on opposite sides of said cage and simultaneously movable on parallel paths in opposite directions, said dies having flat surfaces, a first portion on each flat surface being inclined slightly toward said cage in a rearward direction, a second portion on each surface rearwardly of said first portion being parallel to said path of movement, said second surface portions on the two dies being spaced apart a distance such that blades engaging said second surface portions will penetrate the workpiece to the full desired depth, and means for rotating said cage in synchronism with said oppositely moving dies.

7. The combination according to claim 6, said last-mentioned means comprising a pair of racks secured to said dies, and a gear secured to said cage and meshing with said racks.

8. The combination according to claim 7, the relative spacing of said racks and gear being such that substantial backlash is provided during meshing of the gear and racks.

9. The combination according to claim 7, said die surfaces being further provided with relieved portions rearwardly of said second portions and adjacent the rearward ends of the dies.

10. In an apparatus for forming external teeth on cylindrical workpieces, an annular cage, a plurality of circumferentially spaced tooth forming blades mounted for radial movement in said cage, the inner ends of said blades being disposed inwardly of the inner cage diameter and having shapes complementary to the desired interdental space forms on the workpiece, and means for gradually forcing successive blades radially inwardly against a workpiece centrally positioned within said cage, said last-mentioned means comprising a pair of forcing dies having facing surfaces disposed on opposite sides of said cage, said dies being simultaneously movable in opposite directions, said surfaces being so formed as to gradually decrease the distance between the surfaces and said cage during such movement.

11. In an apparatus for forming external teeth on cylindrical workpieces, an annular cage, a plurality of circumferentially spaced tooth forming blades mounted for radial movement in said cage, the inner ends of said blades being disposed inwardly of the inner cage diameter and having shapes complementary to the desired interdental space forms on the workpiece, and means for gradually forcing successive blades radially inwardly against a workpiece centrally positioned within said cage, said last-mentioned means comprising a pair of elongated dies disposed on opposite sides of said cage and having flat surfaces, said dies being simultaneously movable on parallel paths in opposite directions, said surfaces being slightly inclined whereby the distance between the surfaces and said cage gradually decreases during said die movement.

References Cited in the file of this patent

UNITED STATES PATENTS

| | | |
|---|---|---|
| 874,448 | Smith | Dec. 24, 1907 |
| 1,527,364 | Kinzel | Feb. 24, 1925 |
| 1,622,169 | Zidovec | Mar. 22, 1927 |